Feb. 11, 1969  C. BROXMEYER ET AL  3,426,592
INERTIAL REFERENCE UNIT
Filed April 6, 1964  Sheet 1 of 3

INVENTOR.
CHARLES BROXMEYER
ALDO DE SIMONE
BY
ATTORNEY

INVENTOR.
CHARLES BROXMEYER
ALDO DE SIMONE
BY
ATTORNEY

United States Patent Office 3,426,592
Patented Feb. 11, 1969

3,426,592
INERTIAL REFERENCE UNIT
Charles Broxmeyer, Cambridge, and Aldo De Simone, Wellesley, Mass., assignors to Massachusetts Institute of Technology, Cambridge, Mass., a corporation of Massachusetts
Filed Apr. 6, 1964, Ser. No. 357,706
U.S. Cl. 73—178
Int. Cl. G01c *19/54, 19/34;* G01n *9/18*
8 Claims

ABSTRACT OF THE DISCLOSURE

An inertial reference unit comprising an angular accelerometer, a single degree gyro unit, and a linear accelerometer all mechanically coupled to a shaft of a base-mounted torque motor aligned with the input axis of the gyro unit. The output axes of the gyro unit and angular and linear accelerometers are codirectional. The motor maintains the orientation of the gyro unit so that it has zero angular velocity with respect to inertial space about its input axis. The shaft's rotation provides a measure of the angular deviation of the base about this input axis. Error-producing output axis torque developed in the gyro unit and both accelerometers is neutralized by operation of the angular accelerometer acting in conjunction with a control unit. The angular accelerometer generates a signal which, when applied by the control unit to the torque generators of the gyro unit and both accelerometers, generates a counterbalancing torque that offsets output axis torque.

---

This invention relates generally to inertial navigation systems and particularly to an improved inertial reference unit for use in gimballess inertial systems.

Inertial navigation systems are frequently used in freely maneuverable vehicles such as aircraft, missiles, and ships to provide an indication of the vehicle's position, velocity and orientation relative to an inertial reference frame. A system is basically composed of a computer and an inertial reference unit containing a package of precision gyros and accelerometers. The reference unit senses the vehicle's motion and supplies information to the computer which calculates the components of the velocity and positional vectors. The system functions entirely on Newton's laws of motion and thus features self-contained operation.

Earlier systems were of the gimbaled type wherein the package of gyros and accelerometers was isolated from the vehicle's motion by a complex gimbal structure. However, because of their simpler mechanical construction, gimballess or strap-down systems have become more popular in recent years.

In strap-down systems the package is rigidly attached to the vehicle and is thus subject to the full motion of the vehicle. The direct coupling between the vehicle's motion and the package, however, creates certain design and operational problems.

To derive useful navigational information, the average angular velocity of the vehicle must be measured by the gyros to a small fraction of earth rate. Yet the same gyros must be capable of following the maximum angular velocity of the vehicle. For many problems the maximum angular velocity may be in the range of hundreds or thousands of earth-rate units. Providing a torquing system having the necessary accuracy to satisfy system requirements over this wide operating range has proved most difficult in some cases, impossible in others.

For example, if the maximum angular velocity to which a vehicle is subjected be designated $W_m$, and the increment of angular rotation produced by a single torquing pulse be $\delta\theta$, the period $\delta t$ of an appropriate pulse train is $\delta\theta/W_m$.

The rate N at which pulses must be capable of being applied to the torque generator to follow an angular rate $W \leq W_m$ is $$N = \frac{1}{\delta t} = \frac{W_m}{\delta\theta} \text{ bit /sec.}$$

Assuming the torquing accuracy attainable is one part in 15,000, that $W_m = 100$ eru. (earth-rate units), that the angular velocity of the gyro case about its input axis is zero, and that binary torquing is employed, the quotient of these quantities shows the indicated output rate would be in error by 6.67 meru. (milliearth-rate units).

Output axis torque developed within the gyro also proves troublesome in strap-down systems. When the gyro is subjected to angular velocity about its input axis, a torque proportional to the product of the angular velocity and moment of inertia acts on the float. The float tends to deflect relative to its housing about the output axis of the gyro. A feedback loop comprising the gyro's signal and torque generators and electronics produces a component of counter-torque to maintain the deflection at zero. The counter-torque is measured by the system and ideally supplies an indication of the angular velocity about the gyro's input axis. However, when the gyro is subject to angular acceleration about its output axis, additional torque acts on the float. The feedback loop responds with another component of counter-torque to maintain zero deflection. But the measuring system is unable to distinguish between the two components of counter-torque and erroneously relates the restoring torque solely to input angular velocity.

Similarly, cross-coupling torques introduce measuring errors in conventional strap-down systems. In a typical system, the float containing the gyro wheel experiences a torque due to a cross-coupling moment that is proportional to the product of the angular velocities about the spin reference and input axis. This cross-coupling effect introduces an error in the indicated measure of the angular velocity about the gyro's input axis.

For instance, a gyro in general motion will experience a torque component $M_{cc} = (I_x - I_z) W_x W_z$, where $I_x$ and $I_z$ are float moment of inertia with respect to input axis and spin axis respectively, and $W_x$ and $W_z$ are the float angular velocity components referred to these axes. Hence that indicated angular velocity will be in error by an amount $$W_{cc} = \frac{(I_x - I_z)}{H} W_x W_z.$$

Assuming the typical parameters $I_x = 6000$ gm. cm.$^2$
$I_z = 7000$ gm. cm.$^2$
$H = 4 \times 10^6$ dyne cm. sec.

and the maximum angular rates $$W_x = W_z = 0.944 \text{ deg./sec.}$$

the angular velocity error resulting from the cross-coupling is $$W_{cc} = 0.9 \text{ meru.}$$

In view of the foregoing problems encountered in the inertial reference units of strap-down or gimballess systems, applicants have as the primary object of their invention to provide an improved unit for use in such systems.

It is another object of the invention to provide an inertial reference unit that is mechanically simple, small and easy to manufacture.

It is still another object of the invention to provide an inertial reference unit where the gyros and accelerometers are compensated for cross-coupling torque.

It is a further object of the invention to provide an inertial reference unit where output axis torques have no appreciable effect on the measurement of angular velocity.

It is a still further object of the invention to provide an inertial reference unit wherein first order effects on measurements are not dependent on the accuracy of the torque generators.

Summary of the invention

These and other objects are met by a special inertial reference unit (SIRU) comprising a single-axis stable table and a linear accelerometer. The table includes a single-degree-of-freedom gyroscope, an angular accelerometer, and a base-mounted unit torque motor with a shaft arranged to rotate the unit about the input axis of the gyro. The components are arranged so that the output axes of the linear and angular acelerometers and gyro are all codirectional so they are exposed to the same vector component of angular acceleration, and, furthermore, the input axis of the linear accelerometer is codirectional to that of the gyro. A signal proportional to the output axis torque developed within the angular accelerometer is coupled to the torque generators in the gyro and linear accelerometer. Each torque generator applies a torque to its corresponding float that neutralizes output axis torque. A control element provides a feedback control loop between the gyro and the unit torque motor. This feedback loop controls the orientation of the shaft so that the gyro has zero angular velocity relative to inertial space about its input axis. An incremental angular encoder monitors the rotation of the shaft relative to the base. The encoder provides a measure of the base rotation about the input axis of the gyro and the linear accelerometer supplies a measure of the specific force acting along that axis. (The term "specific force" is here preferred to "linear acceleration," as a linear accelerometer inherently measures the former, which is the vector combination of acceleration and gravity.) Because of the foregoing design features, the measurements performed by the SIRU are not subject to errors caused by cross-coupling or output axis torque.

Description of the drawings

Further objects, features and advantages of the present invention and a better understanding of its operation will be apprehended from the following detailed description, taken in conjunction with the accompanying drawings in which.

Description of the preferred embodiment

Figure 1:
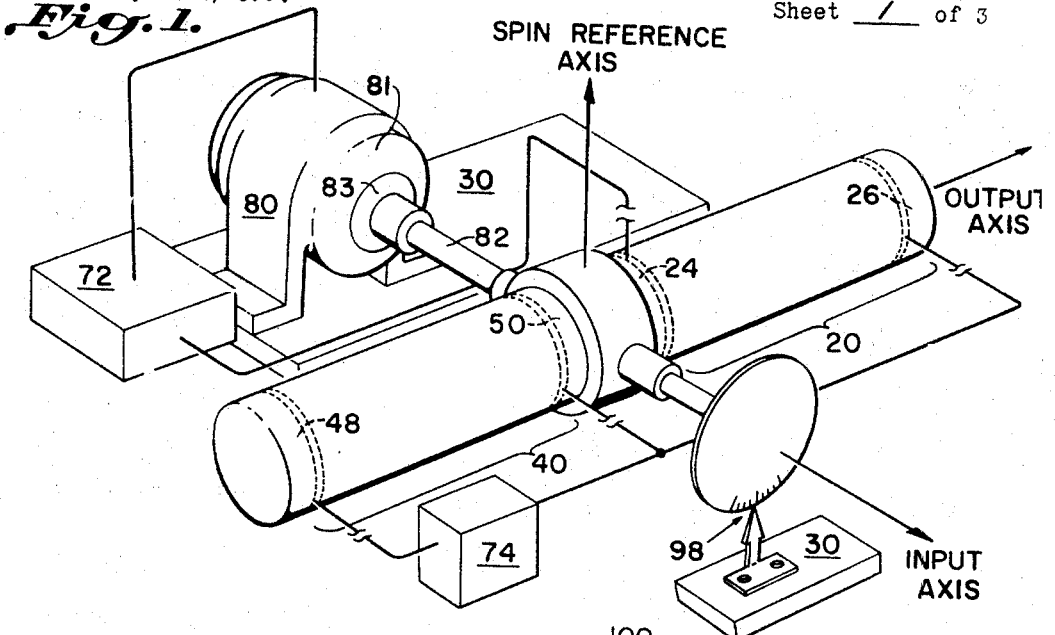
FIG. 1 functionally illustrates the single-axis stable table of the SIRU.

Referring now to FIG. 1, the single axis stable table incorporated in the SIRU comprises angular accelerometer 40, and floated single-degree-of-freedom gyro unit 20 for measuring angular motion. The gyro unit is supported along its input axis by a rotatable shaft 82. The unit shown is the same as the gyroscopic apparatus disclosed in Patent #2,752,791. It incorporates a float containing a spinning gyro wheel, a signal generator 24, and a torque generator 26, both generators being disposed about the output axis.

In the table of FIG. 1, error signals developed within a signal generator 24, are coupled through control element 72 to a separate torque motor 80. Torque motor 80 is rigidly fastened to mounting base 30. Shaft 82 is affixed to rotor 83 of the torque motor and is further coupled to a signal read-out mechanism 98.

Angular accelerometer 40 has a structure similar to the gyro unit; however, it incorporates a floated cylinder instead of a gyro wheel. Accelerometer 40 when subject to the general movement of mounting base 30 provides an output signal proportional to the component of angular acceleration about its output axis. This signal is used to neutralize the undesired output axis torque developed in the gyro. To provide effective neutralization, the output axes of angular accelerometer 40 and gyro unit 20 are codirectional. It is to be understood that the word codirectional in this context is intended generically to include parallelism and coincidence; and therefore, the output axes of the units may coincide as in FIG. 1.

Figure 2:
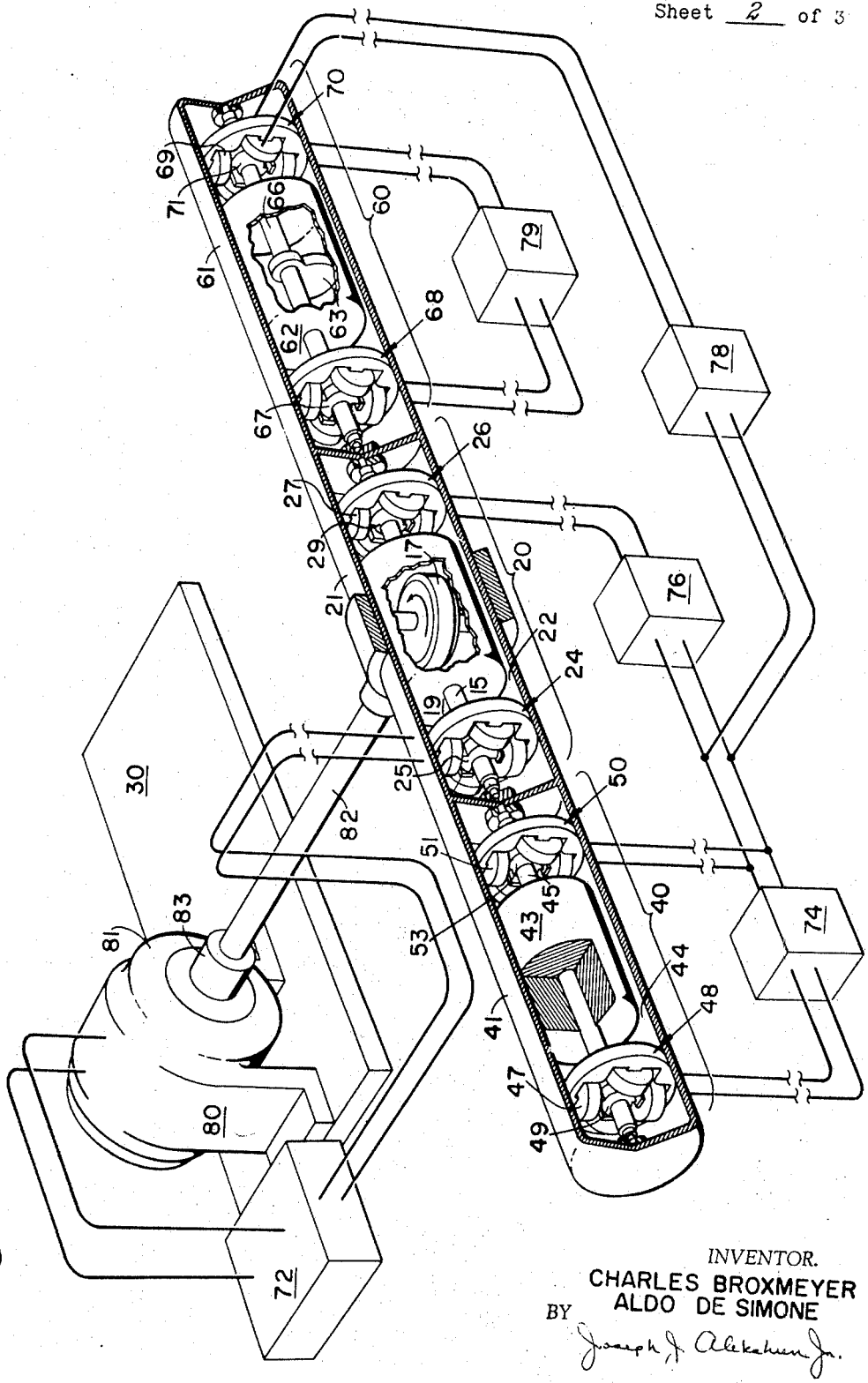
FIG. 2 is a cutaway drawing of the preferred embodiment of the SIRU.

These features are shown in more detail in the cutaway drawing of the SIRU of FIG. 2. The SIRU combines the single axis table of FIG. 1 with a linear accelerometer. Housings 41 and 61 of angular accelerometer 40 and linear accelerometer 60, respectively, are rigidly fastened to housing 21 of gyro unit 20, and further arranged so that the output axes of all units coincide. Gyro unit 20 comprises a high momentum spinning gyro wheel 17 sealed within float 19, the float being suspended in fluid 22 and rigidly coupled by shaft 15 to rotors 25 and 29 of signal generator 24 and torque generator 26, respectively. The readout mechanism of FIG. 1 is not shown in FIG. 2, but is understood to be coupled to shaft 82.

Control element 72 completes an electromechanical feedback loop between signal generator 24 and torque motor 80. This loop functions to restrict the angular deviation of float 19 about the output axis of unit 20 and relative to housing 21 to an acceptably small angle. That is, whenever the gyro unit is turned by a component of angular velocity about its input axis, gyro wheel 17 precesses about the unit's output axis. The precessing float generates an error signal in generator 24. Control element 72, receiving this signal, transmits a torquing signal to torque motor 80. The torque motor rapidly responds by rotating rotor 83 and the whole SIRU, including unit 20, in a direction to minimize the error signal. Torque motor 80, thus, continually operates to realign float 19 about the axis of housing 21.

Because of the quick reaction of torque motor 80, the gyro unit develops virtually no net angular velocity about its input axis relative to an inertial reference frame. Thus, the SIRU has the property of a single axis stable table. Although the gyro unit is stable in inertial space about its input axis, it does, because of operation of shaft 82, rotate relative to base 30. The rotational rate of the gyro relative to the base represents the component of angular velocity about the gyro's input axis with respect to inertial space of the base or any body rigidly fixed thereto such as a maneuverable vehicle. This rate is measured by measuring mechanism 98 of FIG. 1. Again in the case of a vehicle, from three such components of rate are computed changes in the direction cosine matrix, or an equivalent set of numbers, defining the relation between the three axes of a vehicle-fixed frame, and an indicated or reference coordinate axis system.

Still referring to FIG. 2, angular accelerometer 40 contains a cylinder 43 suspended in fluid in chamber 44 and coaxial with and balanced about the output axis of the gyro unit. Cylinder 43 is rigidly connected to respective rotors 49 and 53 to signal generator 48 and torque generator 50 by an interconnecting shaft 45. Generators 48 and 50 are preferably of the microsyn type as are generators 24 and 26 in the gyro unit.

As stated briefly above, one prime function of angular accelerometer 40 is to sense and simultaneously neutralize the undesirable output-axis torque developed within gyro unit 20 created by an angular acceleration about the output axis. Since the output axes of both units coincide, proportional output-axis torques are imparted to cylinder 43 and gyro float 19. The torque developed on the cylinder increases its angular displacement relative to housing 41 and correspondingly creates an increasing large error signal in signal generator 48. This error signal is coupled back through feedback unit 74 to torque generator 50, which as is explained below in more detail, continually forces cylinder 43 to follow housing 41. The error signal developed within the angular accelerometer is also coupled to the winding terminals of stator 27 of torque generator 26 in the gyro unit. By this connection a counter-torque is applied to float 19 which equals and opposes output axis torque in the gyro unit. Accordingly, the drive windings of the torque generator 26 are connected to receive error signals from feedback unit 74 with polarity such that the direction of the torque generated opposes the output axis torque in the gyro.

In practice, the moment of inertia of float 19 and cylinder 43 will not be the same, and different levels of error signal will be required to develop the exact amount of counter-torque in each unit. Whereas feedback unit 74 balances the error signal applied to counter-torque cylinder 43, compensating network 76 similarly balances the torque applied to float 19. Compensating network 76 could be a simple resistor shunting the stator windings of torque generator 26, or a cascaded power amplifier; this depending on the amplitude of the error signal output of feedback unit 74.

Although the unit of FIG. 1 has utility per se as a stable table, inertial systems generally require a measure of specific force. Hence a linear accelerometer 60 such as the pendulous accelerometer of C. S. Draper et al. disclosed in Patent 2,853,287 is conveniently added to form the SIRU of FIG. 2. The pendulous accelerometer comprises a float 62, a pendulous mass 63, the float suspended in fluid and rigidly fastened to an interconnecting shaft 66. Shaft 66 is also rigidly attached to rotor 67 of signal generator 68 and to rotor 71 of torque generator 70. The accelerometer is contained within housing 61. Like the gyro unit, the output axis of the accelerometer is arranged to be codirectional with the output axis of the angular accelerometer; in particular it may be constructed to coincide with the output axes of the gyro unit and angular accelerometer. The input axis of the linear accelerometer is aligned codirectional with the input axis of the gyro unit and measures specific force along that axis. In accord with the prior art, linear accelerometer 60 may be electrically constrained by feedback control unit 79 connected between its signal and torque generators.

The pendulous accelerometer of FIG. 2 also being affected by output-axis torque is likewise in need of counter-acting torque to preserve its measuring accuracy. To accept counter-torque signals developed by angular accelerometer 40, a second set of drive windings may be provided in stator 69. Again, because of possible difference in the angular moment of inertia between the internal floated assemblies, a compensating network 78 is added to the signal path from control unit 74. The same considerations given to the design of compensating network 76 also apply in conjunction with network 78.

Heretofore, feedback control units 74, 79 and control element 72 have been described as coacting with the corresponding signal and torque generators to minimize angular deflection between the respective internal floats and their housing. Although these feedback units could be analog devices, instead, applicant in his preferred embodiment incorporates pulse torquing feedback or what is known as a "relay servo-mechanism." Pulse torquing feedback is preferred primarily because it generates data in digital form, and makes possible the use of digital data processors and computers without the need for intermediate analog-to-digital convertors. Advantages attending digital operation of systems are well known. The relay servo-mechanism in this application is characterized primarily by a constant-magnitude bidirectional restoring force operating on the internal assembly of the instrument, the direction of the instantaneous torque is dependent on the sign of the angular error. A detailed description of the general nature of relay servo-mechanisms by Dean Harold L. Hazen of the Massachusetts Institute of Technology is contained in the September 1934 edition of Journal of the Franklin Institute, especially at page 291.

In the SIRU of FIG. 2 each internal assembly receives bidirectional torquing signal from its corresponding feedback control unit. The functional and structural characteristics of the respective feedback units is basically the same and this is an intended feature of the invention. As a functional description of any one unit sufficiently discloses the general nature of them all, feedback unit 74 is selected and described next in some detail.

Figure 3:
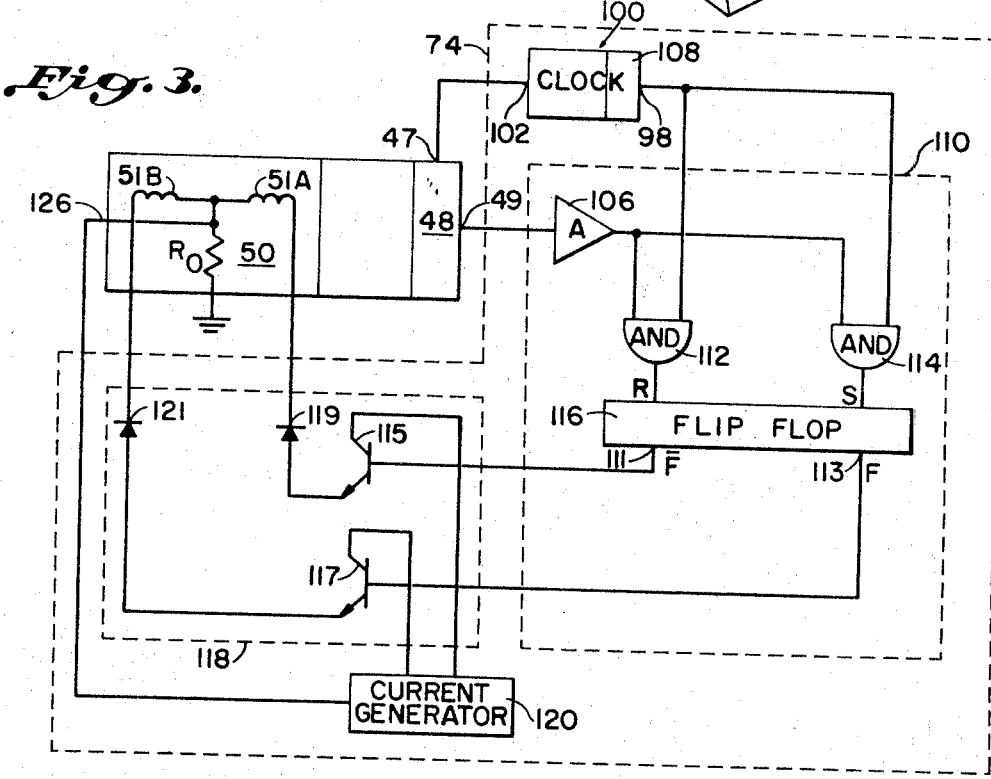
FIG. 3 is a block diagram of a representative control unit incorporated by the SIRU.

Referring to FIG. 3 the pulse torquing control unit 74 basically comprises a sinusoidal clock generator 100, a logic circuit 110 and a current switch 118. The clock signal generator has two output terminals. Generator terminal 102 provides a carrier signal consisting of a sinusoidal voltage of any frequency convenient to the system, and terminal 98 supplies pulses of a frequency that is a fraction of the carrier frequency, for example, 1 kc. for a 4 kc. carrier. The sampling pulse should be in phase with the carrier and may be developed by passing the carrier signal through a frequency divider stage 108 in the clock generator. The stator winding 49 of signal generator 48 receives the carrier signal. This signal is transformer-coupled to the winding of rotor 49 and simultaneously to a conventional squaring amplifier 106.

The rotor of signal generator 48 oscillates with respect to the stator, and the carrier signal induced in the rotor winding is phase modulated accordingly. The squaring amplifier converts the phase modulated signal into phase modulated unipolar rectangular signals of constant amplitude. The rectangular signals are coupled in parallel to a pair of AND circuits 112 and 114, respectively. The AND circuits also receive sampling signals 98 emitted from the clock generator 100. Every time a sampling signal coincides with a rectangular signal emitted from the squaring amplifier, bistable multivibrator 116, controlling current switch 118, receives a switching signal.

Current switch 118 is essentially composed of a pair of complementary transistors 115 and 117, each transistor being at any instant in a saturated or cut-off condition. The switch receives current from a current generator 120 and depending on which transistor is saturated at the time, directs it to one or the other of a pair of drive windings 51A and 51B in the stator 51 of torque generator 50. The operating condition of the respective transistors depends on the state of the corresponding stage of multivibrator 116. That is, when one stage of the multivibrator is cut off, the corresponding output terminal, say terminal 113, applies enough base current to saturate transistor 117. The voltage of the complementary terminal 111, on the other hand, is low and hence transistor 115 is in its cut-off state. Switch 118 in this condition provides a low impedance path between current generator 120 and winding 51B through transistor 117. Winding 51B, therefore, torques cylinder 43 of angular accelerometer 40 in one direction. When the bi-stable multivibrator 116 receives a switching signal from the AND circuit, the operating condition of the respective transistors is reversed and complementary winding 51A of a torque generator is energized instead, and drives the float in the opposite direction.

The current generator is regulated through sampling path 126 connected to precision resistor $R_o$. Because cylinder 43 is always being torqued in one direction or the other direct current continually flows through $R_o$, and D-C voltage always appears across resistor $R_o$. When this voltage departs from a predetermined reference level, current generator 120 receives an error indication and rapidly responds by appropriately varying the output current. For instance, when the sampling voltage falls below the reference level (this condition indicating that the driving current has drifted below a level considered adequate for constant torquing), current generator 120 reacts by increasing the amplitude of its current output.

As the torque is applied according to the relative phase between the rotor and stator winding voltages, the angular deviation between the housing and cylinder 43 is kept to an acceptacle minimum. The torquing signals are proportional to the output axis torque. In the SIRU these signals being applied simultaneously to the gyro and the linear and angular accelerometers in the proper polarity have the effect of neutralizing this torque in those instruments.

Control unit 79 is structurally similar to control unit 74 but has independent significance. Specifically, pulses from control unit 79 impart another component of angular oscillatory motion to float 62 of the linear accelerometer. Consistent with present digital techniques employed in pendulous accelerometers, pulse signals from unit 79 may constitute the specific force input signals supplied to the central computer of an inertial navigation system.

Likewise, control element 72 has a design basically the same as that of control unit 74. Unit 72 receives a phase modulated signal from a signal generator 24 and alternately energizes each of a pair of drive windings in stator 81 of torque motor 80. An angular oscillating motion is imparted to shaft 82 and accordingly to gyro unit 20 about its input axis. The direction of the torque imposed is such as to oppose angular acceleration about the input axis of the gyro unit. The rotational rate of supporting shaft 82, with respect to base 30, is the component of angular velocity of the base relative to an inertial coordinate system existing about the input axis of the gyro unit. This rotational rate is measured by angular measuring mechanism 98 of FIG. 1. Although this measurement can be provided in analog form, a digital signal base is preferred. To provide a digital data translation of this angular rate, mechanism 98 may be either a whole word encoder or an incremental encoder. A whole word encoder generates a digital output signal that is a function of the total angle displaced, whereas an incremental encoder provides a read-out signal every time the shaft's angular position changes by a predetermined increment of a degree. Applicants favor the use of an incremental encoder in the preferred embodiment of their invention. They consider the encoder disclosed in Bernard Patent #3,096,444, manufactured by Dynamics Research Corporation, to be particularly suited for this purpose.

The adverse consequences of power supply drift on the torquing characteristics of each torque generator are minimized if current generator 120 employed in the respective control units is coupled to a common power source. It is important to note that by such an arrangement the effective compensation of the output-axis torque is thus not dependent on the accuracy or regulation of the current source. Furthermore, an external measure of the compensating torque is not required. A change in the level of the current source is automatically compensated by the application of more or fewer torquing pulses to keep the cylinder of the angular accelerometer from deflecting with respect to its housing. Hence the correct compensation signal will always be applied to the floats in the gyro unit and linear accelerometer once the units are calibrated.

As an added feature, the present inertial units and system are free from undesirable cross-coupling moments previously denoted as $M_{cc}$. This is because in the stable table of FIG. 1 and the SIRU of FIG. 2, the floats of the respective instruments are fixed along one axis in inertial spaced and $W_x$ or $W_z$ in the reference equation is zero.

*Application in an inertial navigation system*

Figure 4:
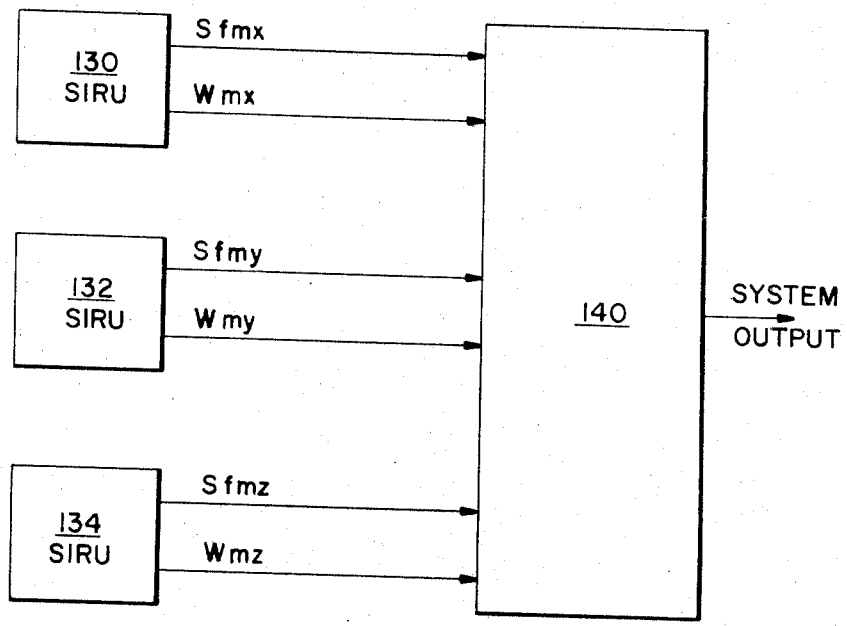
FIG. 4 is a block diagram of a gimballess inertial navigation system employing three SIRU's and a central computer.

Three SIRU's may constitute the inertial reference unit of a gimballess inertial navigation system. They may be arranged to instrument a three-axis vehicular-fixed reference frame, hereafter termed the $m$-frame, and supply the angular and specific force information to a central computer necessary to calculate components of the vehicle's position and velocity. In particular, as shown in FIG. 4 each of the SIRU's 130, 132 and 133 provides the component of specific force $sf_{mx}$, $sf_{my}$ and $sf_{mz}$ and the angular velocity $W_{mx}$, $W_{my}$, $W_{mz}$ corresponding to the $x$, $y$, $z$ orthogonal axes of the $m$-frame. These component outputs are related by navigational equations to physical quantities of velocity and position designated as the System Output. The equations are solved by computer 140. As the invention in its preferred embodiment comprehends the use of digitally coded information, the outputs from the respective inertial units are incremental quantities, and the equations mechanized by computer 140 are difference equations. It should be again stressed, however, that analog coding could be used, whereby the unit output signals would be continuous quantities.

Figure 5:
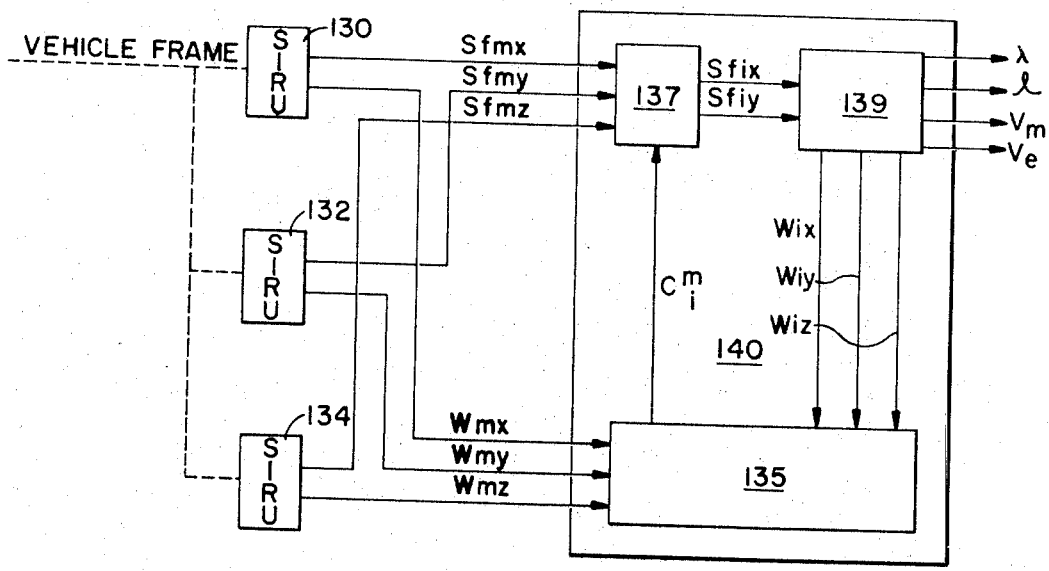
FIG. 5 is a signal-flow block diagram of the system of FIG. 4.

New referring to FIG. 5, computer 140 need perform two additional operations over those normally performed by computers adopted in the current gimbaled navigational system. The input quantities to the computer of a conventional gimbaled system are specific force signal components $sf_{ix}$ and $sf_{iy}$ measured along a so-called indicated ($i$) axis system. Indicated $x$ and $y$ axes are fixed to the gimbals, and almost coincide with the respective $x$ and $y$ axes of a geographic reference frame. A conventional computer operates on the specific force signals $sf_{ix}$ and $sf_{iy}$ to produce the desired angular velocity components $W_{ix}$ and $W_{iy}$, and $W_{iz}$ about the respective axes of the indicated axis system together with the desired physical quantities such as latitude $\lambda$, longitude $l$, north velocity $V_n$ and east velocity $V_e$.

A conventional computer component 139 is a part of computer 140 of FIG. 5. However, because the output information from the inertial units is referred to the vehicular $m$-frame, the computer must perform two additional operations before the signals are usable by computing component 139. Computer 140, therefore, additionally performs the following computations:

(1) Computes a transform correlating the vehicular $m$-frame to the indicated $i$-frame. This computation is perfomed by component 135.
(2) Applies this transform to the specific force information measured relative to the $m$-frame and, accordingly, derives the specific force information referred to the indicated $i$-frame. This derivation is performed by component 137.

Where $C_m^i$ represents the direction cosine matrix from the $i$-frame to $m$-frame, the transformation performed by computer component 135 in FIG. 5 satisfies the following matrix equation:

$$\delta C_m^i = C_m^i \delta \theta_i - \delta \theta_m C_m^i$$

Thus, component 135 uses incremental ($\delta$) angular changes of the $m$-frame or $\delta \theta_m$ from the SIRU's and incremental angular changes $\delta \theta_i$ of the $i$-frame supplied by component 139 and derives the matrix of direction cosines $C_m^i$. Computer component 135 also takes the inverse of $C_m^i$ to derive the matrix $C_i^m$. Matrix multiplier 137 receives with the cosine matrix $C_i^m$ a specific force matrix referred to the vehicular $m$-frame and generates the product of the two matrices. The product $sf_{ix}$ and $sf_{iy}$ is usable by the conventional computer 139. Representative physical quantities, such as $\lambda$, $l$, $V_n$, $V_e$ or the like, are available as outputs of conventional computer component 139.

A functional block diagram of conventional computer component 139 is shown and described in "Analysis of an Inertial Navigation System" by Charles Broxmeyer, R-241, August 1959, a publication of the Instrumentation Laboratory of the Massachusetts Institute of Technology (M.I.T.). Specifically, FIGS. 7–1 and 7–2 of R-241 show a computing component capable of receiving specific force information $sf_{iy}$ and $sf_{ix}$ and computing, as representative quantities, longitude, latitude and angular rates such as $W_{ix}$ and $W_{iz}$, all such quantities referred to an indicated axes system. The accelerometers shown in FIG. 7–1 of R–241 would not be required when that computing element is incorporated in the present system as the linear accelerometer in each inertial reference unit performs the same function. In the gimbaled system of FIGS. 7–1 and 7–2 of R–241, quantities $W_{ix}$, $W_{iy}$ and $W_{iz}$ are coupled to a stable table. In the present system, however, $W_{ix}$, $W_{iy}$ and $W_{iz}$ are coupled to transformation computer 135 instead, as is shown in FIG. 5.

One suitable type of transformation computer component 135 is synthesized by Thomas Wiener in his doctoral thesis, "Theoretical Analysis of Gimballess Inertial Reference Equipment Using Delta-Modulated Instruments, March 1962, T–300 Instrumentation Laboratory of M.I.T." The direction cosine matrix is defined in Dynamics: Particles Rigid Bodies and Systems by R. Halfman, Addison-Wesley Publishing Company, vol. 1, 1962, pp. 366–369. The direction cosine matrix is designated as $C_m^i$ in the current specification and as C by Wiener in chapter 4 of his thesis, where he derives the mathematical basis for the transformation computer of chapter 5. Wiener proposes a digital differential analyzer consistent with his FIG. 5–2 to solve Equations 5–9 on page 78. Allowing for differences in symbolism, Equations 5–9 are a special form of the above mentioned direction cosine matrix equation $$\delta C_m^i = C_m^i \delta\theta_i - \delta\theta_m C_m^i$$

the distinction being that Wiener prefers to use fixed indicated reference axes, whereas applicants prefer that their system accommodate a rotatable indicated coordinate axis system. It is considered to be well within the skill of the art to modify the computer of FIG. 5–2 to accommodate the equations of the present system. Hence, whether a fixed or rotatable indicated axis system is preferred, it is considered that FIG. 5–2 of T–300 provides sufficient information for the design of computer component 135 for either application.

While a particular embodiment of the system has been described it should, of course, be understood that it is not to be so limited. Modifications in hardware may be made and yet remain within the intended scope of the invention. For instance, the gyroscopic element employed in the stable table is shown as containing a rigid gyro wheel. As the state of the gyro art progresses other types of gyroscopic devices having other configurations, such as those incorporating high momentum particles, may become available. Likewise, nonpendulous accelerometers may be combined with the single axis stable table of FIG. 1 to form a SIRU for a system.

What is claimed is:

1. In an inertial reference unit for use in a maneuverable vehicle the combination comprising:

a gyro unit enclosed by a housing and having a first input axis, a first output axis, and a float containing a spinning gyro wheel internally fixed to said float, said float susceptible to rotation about said first output axis due to gyroscopic action caused by rotation of said gyro unit about said first input axis and by output axis torque caused by rotation of vehicle about said first output axis, said gyro unit further including a first signal generator and a first torque generator each mechanically coupled to said float, said signal generator producing an error signal when said float is angularly displaced about said first output axis relative to said housing and said torque generator adapted to torque said float about said first output axis, a torque motor having a first motor part adapted to be fixed to said vehicle, and a second motor part rotatable relative to said first motor part, a rotary supporting shaft having an axis of rotation coinciding with said first input axis and connecting said second motor part to said gyro unit, said shaft providing means for rotating said gyro unit about said first input axis relative to said vehicle, a control element electrically coupled to said first signal generator and to said torque motor and operating to maintain said gyro until fixed in inertial space about said first input axis, an angular accelerometer comprising a housing mechanically coupled to said rotary shaft, a second output axis codirectional with said first output axis and a floated mass balanced and rotatable about said second output axis, a second torque generator, and a second signal generator, said generators mechanically coupled to said mass, said second signal generator producing an error signal when said mass is angularly displaced about said second output axis relative to said housing and in response to output axis torque developed on said mass, caused by rotation of said vehicle about said second output axis, a feedback control unit including first means coupling said control unit to said second signal generator and second means coupling said control unit to said first torque generator and third means coupling said control unit to said second torque generator, said control means receiving said error signal from said second signal generator and generating a torquing signal which when applied by said third coupling means to said second torque generator minimizes said angular displacement of said mass of said angular accelerometer and which when applied by said second coupling means to said first torque generator minimizes said angular displacement of said first float relative to said gyro housing caused by output axis torque developed on said first float.

2. In an inertial reference unit for use in a maneuverable vehicle, the combination set forth in claim 1 wherein said housing of said angular accelerometer is rigidly affixed to said gyro unit housing and so arranged that said first and second output axes coincide.

3. In an inertial reference unit for use in a maneuverable vehicle, the combination defined in claim 1 further comprising, an angular measuring device for measuring the angular displacement of said second motor part with respect to said first motor part.

4. In an inertial reference unit for use in a maneuverable vehicle the combination set out in claim 1 and further comprising:

a linear accelerometer enclosed by a housing mechanically coupled to said rotary shaft and having a second input axis and a third output axis codirectional with said first output axis, a floated pendulous mass susceptible to an angular displacement relative to said housing about said third output axis by specific force acting on said mass along said second input axis and by output axis torque caused by rotation of said vehicle about said third output axis, said accelerometer further comprising a third torque generator and a third signal generator each mechanically coupled to said pendulous mass, said torque generator adapted to torque said mass about said third output axis, and said third signal generator measuring said angular displacement of said pendulous mass relative to said housing, and fourth means coupling said feedback control unit to said third torque generator, and wherein said control unit produces a torquing signal from said error signal from said second signal generator which when applied by said fourth coupling means to said third torque generator minimizes said angular displacement of said pendulous mass caused by output axis torque developed on said mass.

5. In an inertial reference unit as set out in claim 4, said linear accelerometer being rigidly attached to said gyro unit housing and so arranged that said first, second and third output axes coincide.

6. In an inertial reference unit as defined in claim 4, said combination additionally comprising:
   an angular measuring device for measuring the angular displacement of said second motor part with respect to said first motor part.

7. In an inertial reference unit as set forth in claim 6, said angular measuring device constituting a whole word encoder.

8. In an inertial reference unit as defined in claim 6, said angular measuring device constituting an incremental encoder measuring incremental changes in said angular displacement.

References Cited

UNITED STATES PATENTS

| | | | |
|---|---|---|---|
| 2,817,974 | 12/1957 | Muzzey et al. | 74—5.4 |
| 2,937,532 | 5/1960 | Emmerich | 74—5.4 |
| 2,961,877 | 11/1960 | Edwards | 74—5.22 |
| 3,113,462 | 12/1963 | Wendt | 73—516 X |
| 3,238,791 | 3/1966 | Brodersen | 74—5.4 |
| 2,959,057 | 11/1960 | Winker | 73—516 |

ROBERT B. HULL, *Primary Examiner.*

U.S. Cl. X.R.

74—5.22, 5.4; 33—226, 204